Fig. I.

June 28, 1960 L. C. SMITH 2,942,455
TENSILE TESTING APPARATUS
Filed May 15, 1957 2 Sheets-Sheet 2

INVENTOR
Loren C. Smith
BY George N. Hopkins
ATTORNEY

United States Patent Office 2,942,455
Patented June 28, 1960

2,942,455

TENSILE TESTING APPARATUS

Loren C. Smith, Livonia, Mich., assignor to Wyandotte Chemicals Corporation, Wyandotte, Mich., a corporation of Michigan Filed May 15, 1957, Ser. No. 659,282

6 Claims. (Cl. 73—15.6)

This invention relates to ways and means for determining the tensile strength of elastomeric materials and more particularly for determining the tensile strength of elastomeric materials in a fluid environment at elevated temperatures and elevated pressures.

The term tensile strength as used herein and in the claims is defined as the greatest longitudinal stress a substance can bear without tearing asunder and is usually expressed as the weight per unit area necessary to produce rupture.

With the advent of supersonic speeds, the operating temperatures of aircraft have increased because of increased power requirements and other factors. This has resulted in exposure of various aircraft parts, including parts fabricated from elastomeric materials, to various liquids at elevated temperatures not previously encountered as subsonic speeds. As a consequence of this advance in aircraft technology, there has arisen a need for instrumentation which is capable of performing tests on the physical properties of elastomeric materials and analyzing the results of such tests when the elastomeric materials are exposed to petroleum base fuels and other fluids at elevated temperatures.

The prior art discloses several systems for determining the tensile strength of various materials. These systems generally employ weights, hydraulic sensing elements or electronic force transducers to measure the tensile load being applied to the tensile test specimen. These existing systems are, in general, unsatisfactory for this problem of high temperature liquid immersion testing because the tensile load measurements must be made with the sample inside a pressure vessel. These existing systems, if used, would have to be applied through a sliding seal in the pressure wall. The possibility of measuring the tensile load through a sliding seal was found to be impractical because the force of friction was not only significant in magnitude, but erratic.

An object of this invention is, therefore, to provide a new and improved apparatus for tensile testing of elastomeric materials.

Another object of this invention is to provide a new and improved apparatus for determining tensile strength of elastomeric materials in a fluid environment at elevated temperatures.

A still further object of this invention is to provide an improved apparatus for measuring the pure tensile load applied to an elastomeric material in a fluid environment at elevated temperatures wherein errors due to friction are minimized.

A still further object of this invention is to be able to measure the pure tensile load applied to an elastomeric specimen without knowing the total tensile load being applied.

Other objects will appear as this specification proceeds.

In summary, one aspect of my invention is concerned with a method for determining the tensile strength of an elastomeric specimen in the presence of a test fluid and at a significant temperature, which comprises suspending a specimen of said elastomeric material in a body of said test fluid, applying a stretching force to said specimen, receiving said stretching force in a pressure-responsive member and transmitting said received stretching force through said pressure-responsive member to a body of fluid at a significant pressure whereby a change in pressure is produced in said last mentioned body of fluid which change in pressure is a known function of the tensile load applied to said elastomeric specimen. The tensile load which is measured by the difference of pressure is the pure tensile load applied to the specimen as distinguished from the total tensile load or stretching force applied. The body of fluid referred to herein and in the claims can be either the test fluid or a second body of fluid. When the body of fluid is the test fluid itself, I refer to this body of fluid as the pressure-sensing fluid. However, when the test fluid is used in combination with a second body of fluid, I refer to this latter body of fluid as the pressure-sensing fluid. When a one fluid system is employed to determine the tensile strength of an elastomeric specimen, I have then found it necessary that the pressure on said fluid must increase and that the strength of the specimen must be such as to support a pressure-responsive member. The stretching of the specimen is, in general, carried out at a predetermined constant rate although other rates such as irregular rates or exponential rates are also suitable in the method of my invention. When the specimen is stretched at a predetermined constant rate, means for stretching the specimen are so selected that the rate of speed will be constant regardless of the load.

The method of the invention is operable over a broad temperature range. However, the method disclosed herein is especially suited for carrying out the tensile testing at elevated temperatures. This is particularly desirable since, as it has been previously pointed out, it has become increasingly important to determine the tensile strength of elastomeric specimens at elevated temperatures, especially in view of the rapid advances being made in, for example, the aeronautical industries.

The pressure which the pressure-sensing fluid exerts is significant in my invention since changes in this pressure directly reflect the force being applied to stretch the elastomeric specimen. The initial operating pressure which is selected will depend upon the nature of the pressure-sensing fluid. Where the pressure-sensing fluid selected is in the liquid state and the stretching of the specimen results in a decrease in the pressure which the fluid exerts, then the initial pressure selected must be at a significantly high value so that during the stretching of the specimen the decrease in pressure of the liquid does not fall below the vapor pressure of said liquid. When the pressure-sensing fluid is in the vapor state and the stretching of the specimen results in an increase in the pressure of said fluid, then the initial pressure selected must have a significant value so that the increase in pressure does not cause a change of phase, i.e. from vapor phase to liquid phase. The difference in pressure resulting from the stretching of the elastomeric specimen, whether this difference be an increase or decrease in pressure, is a known function of the pure tensile load applied to said specimen.

In accordance with one embodiment the test fluid is separated from a pressure-sensing fluid by a pressure-sensitive partition. The two fluids, i.e. test fluid and pressure-sensing fluid, each separated from the other by the pressure-sensitive partition function as a pressure-responsive system. The pressure-sensitive partition can be constructed out of any material which is compatible with the fluids used in the testing apparatus. A preferred pressure-sensitive partition is a flexible metallic bellows.

The flexible metallic bellows is, in general, a one-piece expansible and collapsible member made from a flat disc of metal by a series of cupping and drawing operations to produce a tube which is subsequently formed hydraulically or mechanically into a deeply folded or corrugated seamless unit. Some bellows are roll-formed while others are formed hydraulically and when desired, the bellows can be produced by a combination of these two processes.

Any suitable means for externally applying a tensile load of desired magnitude to the specimen can be employed. One satisfactory means is a regulable constant speed pulling motion drive unit which can take the form of a hydraulic cylinder mechanism containing a hydraulic pump. It is preferable that the hydraulic cylinder mechanism contain a pressure compensated variable flow valve in the cylinder circuit so as to permit selection of the desired speed. This pressure compensated variable flow valve also permits constant speed regardless of load.

The tensile load, when applied, is transmitted through the specimen to the flexible pressure-sensitive partition thereby causing a change in the lateral position of the flexible partition. The pressure-sensing fluid disposed within the pressure-sensitive partition responds to this change in position and this response, represented by a difference in pressure, is communicated to means for measuring this difference in pressure. A suitable means for measuring this difference in pressure is a differential pressure cell. Generally, there are two types of differential pressure cells which can perform this measurement. One operates on a pneumatic principle and the other operates on an electronic principle. The cell operating on the pneumatic principle is a pneumatic force balance device. Pressures are applied to the opposite sides of a diaphragm through high and low pressure taps and the resulting difference in pressure is converted into proportional air pressure which is transmitted to recording instruments where the actual differential pressure is registered. The cell operating on the electronic principle converts differential pressure into electrical impulses which are transmitted to recording instruments.

A second aspect of my invention is concerned with a new and improved tensile testing apparatus which is particularly adapted for high temperature liquid immersion tensile testing. In accordance with this aspect of the invention, means are provided for suspending an elastomeric specimen in a testing chamber to which a fluid may be admitted. Suitable means are provided for applying a tensile load to said elastomeric specimen and pressure responsive means are provided for measuring the tensile load applied.

The means for suspending an elastomeric O-ring specimen in the testing chamber can take the form of a pair of cylindrical and rotatable specimen holders which can be supported in specimen holder brackets by specimen holder pins. It is preferable that the specimen holders be cylindrical and rotatable since it is well known that when grippers or similar compression units are used the elastomeric specimen is not stretched throughout its entire length, but that the specimen becomes thinner at the sides and remains thick in the region of the compression units. It is also desirable that the specimen holders have beveled edges of increasing diameter so as to align the elastomeric specimens.

Any suitable means can be used for applying a tensile load to the elastomeric specimen. I have found it desirable, however, to connect one of the specimen holder brackets to a pulling rod which extends beyond the chamber. A portion of the pulling rod which extends beyond the chamber is connected to a pulling motion drive unit, a preferred form of which is a hydraulic cylinder mechanism containing a hydraulic pump. It has been found advantageous to incorporate within the hydraulic cylinder mechanism a pressure compensated variable flow valve so as to permit selection of the desired speed.

The pressure-responsive means can take the form of a flexible pressure-sensitive partition disposed within the testing chamber and separating said testing chamber from a pressure-sensing chamber formed by said pressure-sensitive partition. Conduits are provided for admitting a test fluid into said testing chamber and for admitting a pressure sensing fluid into said pressure-sensing chamber. Conduits are also provided for transmitting the pressure of said fluids to suitable means for determining the difference in pressure between said fluids. The differential pressure measuring system is calibrated with a standard extension spring to establish the relationship of differential pressure to the force applied to the specimen.

If the tests for determining tensile strength are to be carried out at elevated temperatures, then the elastomeric specimens which are to be tested are generally stored in the test fluid for a predetermined time at the desired testing temperature before the test is carried out. Any suitable heating means can be employed to heat the test fluid and components of the apparatus within the test fluid. A heating jacket containing an annular resistance heating element disposed within suitable insulation material through which pass power leads to a regulable power source is preferably employed.

More specifically my invention is concerned with improved means for measuring the tensile load applied to an elastomeric specimen in the presence of a test fluid and in a closed system so as to avoid frictional errors which would be encountered if the mechanical testing systems of the prior art were employed. In accordance with a preferred embodiment of the invention provision is made for suspending an elastomeric specimen between holders in a confined space to which a test fluid may be admitted and in which the specimen may be heated to the desired testing temperature. The specimen is associated with a flexible pressure-sensitive partition which separates a pressure-sensing fluid from the test fluid. Suitable means are provided for externally applying a tensile load of desired magnitude to the specimen. The tensile load, when applied, is transmitted through the specimen to the flexible pressure-sensitive partition thereby causing a change in the lateral position of the partition. The pressure-sensing fluid disposed within the pressure-sensitive partition responds to this change in position, and this response, represented by a difference in pressure, is directly porportional to the tensile load being applied.

It will be understood that the foregoing general description and the following detailed description as well are exemplary and explanatory but are not restrictive of the invention.

Figure 1:
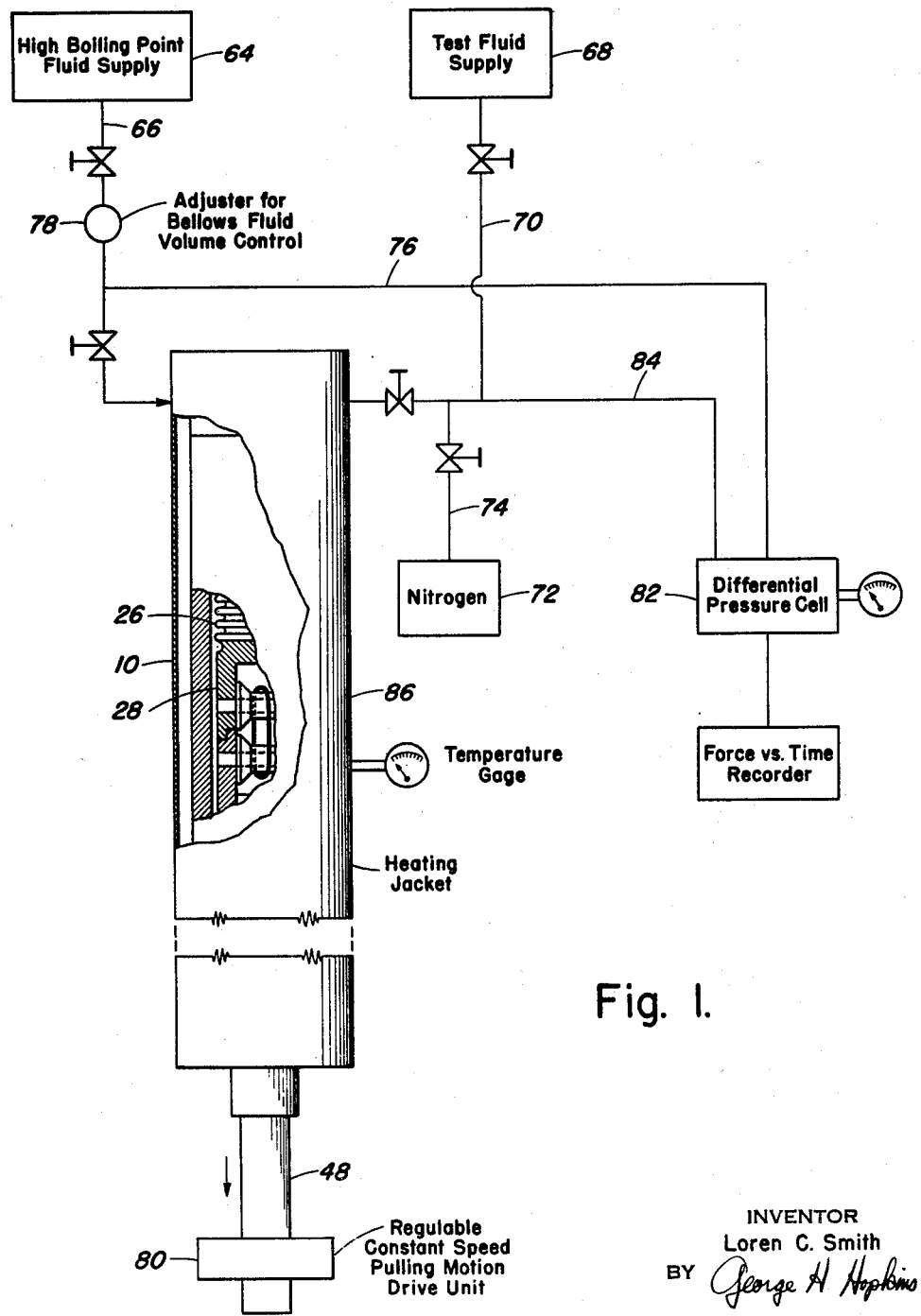
Fig. 1 represents a diagrammatic view of a tensile testing apparatus with parts broken away to indicate the position of the tensile test specimen with reference to the pressure-sensitive partition.
Figure 2:
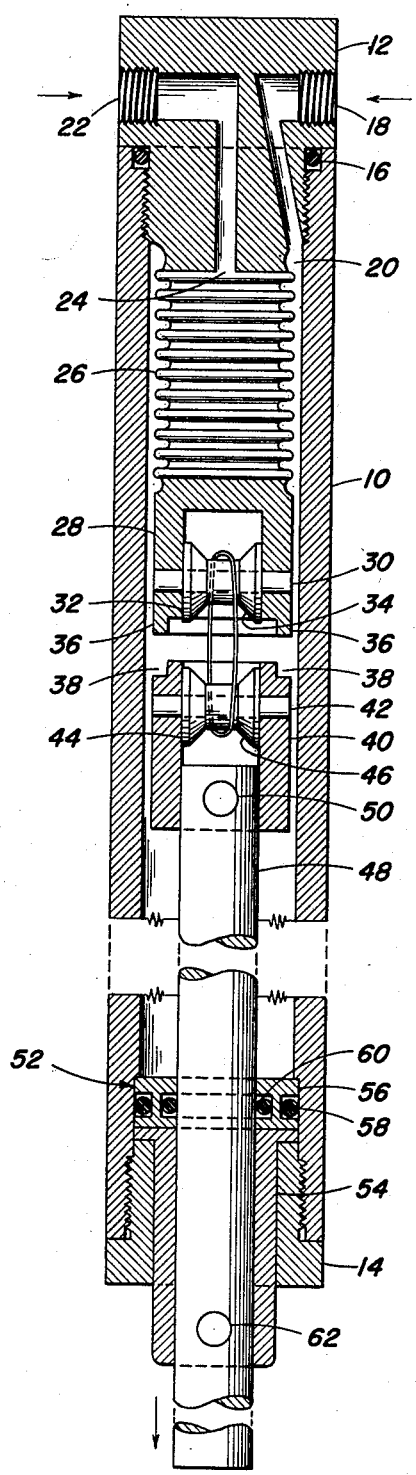
Fig. 2 represents a detailed diagrammatic view of the testing apparatus as illustrated by Fig. 1.

Referring now more particularly to the accompanying drawings, a testing chamber 20 is formed by a casing 10. The chamber is closed at one end by a first casing head 12 which is threadedly connected to the casing and at the other end by a second casing head 14 which is also threadedly connected to the casing. An elastomeric O-ring 16, having high temperature stability, provides a fluid seal between the first casing head and the casing.

The first casing head has a pair of conduits disposed therein and each of said conduits has a terminus at the surface of said casing head. One of said conduits, the test fluid transfer line 18, communicates from the surface of said casing head to the interior of the testing chamber 20 formed by the casing. The other of said conduits, the pressure-sensing fluid transfer conduit 22, communicates from the surface of said casing head to the interior of a chamber 24 formed by a pressure-sensitive partition 26. The pressure-sensitive partition is disposed within the test chamber and separates a chamber for containing a pressure-sensing fluid from said test chamber.

The pressure-sensitive partition can be constructed out of any material which is compatible with the fluids used in the testing apparatus. A preferred pressure-sensitive partition is a flexible metallic bellows which is fabricated out of stainless steel. Stainless steel is desirable as the material of construction because this material has high strength and low spring rate. The flexible metallic bellows is, in general, a one-piece expansible and collapsible member made from a flat disc of metal by a series of cupping and drawing operations to produce a tube which is subsequently formed hydraulically or mechanically into a deeply folded or corrugated unit.

One end of the flexible pressure-sensitive partition is integral with the first casing head and the other end of said partition is connected with a first specimen holder bracket 28. A cylindrical pin 30 is disposed within said bracket so as to support a cylindrical and rotatable specimen holder 32. This specimen holder bracket has projections 36 for engaging grooves 38 in a second specimen holder bracket 40. During assembly of the apparatus, the projections are in contact with the grooves and thus prevent the tensile test specimen from becoming twisted. The second specimen holder bracket has a cylindrical pin 42 disposed therein for supporting a cylindrical and rotatable specimen holder 44. A preferred specimen holder is one which has beveled edges of increasing diameter for aligning an endless band of elastomeric material such as is illustrated by reference characters 46 and 34. The second bracket is connected to a pulling rod 48 by means of a removable fastener 50. A suitable fastener would include a cylindrical and removable pin having a tapered end.

A static seal 52 lies in proximity to a sealing gland 54 and provides a fluid seal between pulling rod 48 and the sealing gland and between the casing and the sealing gland. The static seal comprises metallic and elastomeric components having a high temperature stability. These components include a metallic ring 56 having a groove along its outer edge for holding an elastomeric O-ring 58 in contact with the casing 10. A second elastomeric ring 60 is disposed along the inner periphery of said metallic ring and makes contact with the pulling rod 48. A cylindrical and removable pin 62 connects the pulling rod to the sealing gland.

A high boiling point fluid supply vessel 64 is in fluid flow communication with the pressure-sensing chamber 24 formed by the pressure-sensitive partition 26. This vessel communicates with said chamber by means of a pressure-sensing fluid supply conduit 66 which conduit can be threadedly connected to the pressure-sensing fluid transfer conduit 22. This latter conduit is disposed within the first casing head and leads into the pressure-sensing chamber. This vessel is the storage container for the pressure-sensing fluids. In general, liquids having low vapor pressures and consequently high boiling points are most suitable as pressure-sensing fluids. Examples of preferred pressure-sensing fluids include dibutyl phthalate and dioctyl phthalate. However, any high boiling fluid can be used as long as the fluid does not autodecompose at the temperatures at which tensile testing is carried out.

A second storage vessel 68 is in fluid flow communication with the testing chamber 20 formed by the casing 10. This second vessel communicates with the testing chamber 20 by means of a test fluid supply conduit 70 which can be threadedly connected to the test fluid transfer conduit 18. As indicated above the test fluid transfer conduit 18 leads into the testing chamber 20. This vessel is the storage container for the test fluid. In general, the test fluid can be any chemical which is compatible with the materials of construction. Examples of petroleum base fuels which can be employed in accordance with the invention are 70/30 mixture of isooctanetoluene, mixtures of isooctane, toluene, benzene and xylene, and jet propulsion type fuels. However, any test fluid can be used as long as the test fluid does not autodecompose at the temperatures at which the test is carried out.

A pressure-sensing fluid flow conduit 76 leads into one side of differential pressure cell 82 and a test fluid flow conduit 84 leads into the other side of said differential pressure cell. Since the metal bellows, the preferred form of the flexible pressure-sensitive partition, is itself a metal spring, a differential pressure cell with very low displacement is a necessity as liquid displacement from the bellows would allow the metal bellows to exert force on the elastomeric specimen and hence introduce an error in the relation between measured differential pressure and actual stress applied to the specimen. Differential pressure cells which are suitable in the apparatus of my invention are those which operate on either a pneumatic or electronic principle. In those differential pressure cells which operate on a pneumatic principle, pressures are applied to opposite sides of a diaphragm through high and low pressure taps. The resulting differential pressure is converted into proportional air pressure which is transmitted to remotely located pneumatic receiving instruments such as indicators, recorders or controllers where the actual differential pressure is registered. Instead of using measuring apparatus operating on a pneumatic principle, similar apparatus operating on an electronic principle may be employed. When the latter apparatus is used, the differential pressure cell converts differential pressure into electrical impulses which are transmitted to recording instruments. A preferred embodiment of a differential pressure cell operating on an electronic principle is a strain gauge or a differential type transformer with a very low displacement.

An adjuster 78, for controlling the volume of pressure-sensing fluid disposed within the pressure-sensitive partition, is positioned within the pressure-sensing fluid supply conduit 66 intermediate to the pressure sensing fluid supply vessel and the pressure-sensing fluid transfer conduit 22. This adjuster can take the form of a volume adjusting piston. A preferred volume adjusting piston is a manually operated screw driven piston.

Any suitable means for applying a tensile load to the elastomeric test specimen can be employed. One suitable means is a regulable constant speed pulling motion drive unit 80 which has means for clamping the pulling rod 48. An embodiment of this drive unit is a hydraulic cylinder mechanism. This mechanism contains a hydraulic pump and the necessary control equipment for the convenience of the operator in conducting the tests. A pressure compensated variable flow valve in the cylinder circuit is provided to permit dial selection of any pulling speed from 40 inches per minute down to 2 inches per minute with constant speed regardless of load.

In conjunction with the cylinder movement, in the hydraulic cylinder mechanism 80, is a geared rack and pinion assembly (not shown), designed to open and close an electric switch at intervals of, for example, one centimeter. This switch is connected to an auxiliary marking pen on the recorder so that the recorder actually produces a force vs. elongation curve for each elastomeric specimen tested.

A heating jacket 86 encloses casing 10 for tensile testing at elevated temperatures. Any suitable heating means can be used. A preferred heating jacket would include an annular resistance heating element disposed within suitable insulation material through which pass power leads to a suitable power source. The resistance element should preferably be provided with means for temperature control.

Properties of elastomeric materials which can be tested with the apparatus disclosed hereinabove include tensile strength and elongation properties. To carry out these tests on an elastomeric test specimen, the first casing head 12 and units consecutively integral therewith, i.e. bellows 26 and first specimen holder bracket 28, are removed from the casing 10. The sealing gland connecting pin 62 is disengaged from its seating and the pulling rod 48 including the second specimen holder bracket which is connected thereto is pushed through the casing until the second specimen holder bracket is beyond the end of the casing. The specimen holder pins are removed from specimen holder brackets. An endless band of elastomeric material to be tested is placed about the cylindrical portion of the specimen holders. The specimen holders and pins are then reassembled in the specimen bracket holders.

The projections 36 of the first specimen bracket holder are positioned so that they engage the grooves 38 of the second specimen bracket holder and the pulling rod and the first casing head and parts integral therewith are positioned within the casing and the casing head is then threadedly connected to the casing.

The sealing gland connecting pin 62 is positioned in its seat and the test fluid which is contained in a test fluid supply vessel 68 is then admitted into the testing chamber formed by the casing 10. The test fluid, as previously set forth, can be any fluid which is compatible with the materials of construction of the testing apparatus. A pressure-sensing fluid which is contained in a high boiling point fluid supply vessel 64 is then admitted into the pressure-sensing chamber 24 formed by the pressure-sensitive partition 26.

The heating jacket is then put into operation so as to heat and maintain the elastomeric specimen, test fluid and pressure-sensing fluid at a predetermined temperature. In general, the maximum temperature at which a test can be conducted is the maximum safe temperature for the static O-ring test tube seals in the presence of the test fluid at the prevailing pressures. Also, the testing of the elastomeric specimens should be carried out at temperatures below the autodecomposition points of the fluids used in the tensile testing system.

Suitable materials, from which sealing rings having high temperature stability can be fabricated, are organo-inorganic polymers. By organo-inorganic polymers we refer to polymeric materials which have one or more inorganic atoms in the polymer units. A preferred material having high temperature stability is a polytetrafluoroethylene polymer manufactured by the E. I. du Pont de Nemours & Company and sold under the trademark Teflon. However, when higher temperatures are desired, high temperature packings can be used. Suitable high temperature packings include metallic packings, asbestos and metal-asbestos.

Subsequent to the application of heat, the volume of the pressure-sensing fluid may be such that the flexible pressure-sensitive partition will not be at its free length and the resulting force will cause a differential pressure to appear on the recorder. By adjusting the volume of the pressure-sensing fluid by means of an adjuster 78, the pressure-sensitive partition can be relaxed and the recorder will read 0 pounds per square inch gauge.

There is a minimum operating pressure at which the test can be conducted, which is inherent in the design of the test apparatus. The operating pressure must be sufficiently high, so that during the pulling operation, the pressure of the pressure-sensing fluid does not fall below its vapor pressure. Employing solvent type test liquids at elevated temperatures will result in elevated pressures. If, in applying heat to the casing, this minimum pressure is not obtained it is then necessary to pressurize the pressure-sensing fluid with an inert gas. Any inert gas can be used. I have found it preferable, however, to use nitrogen. The nitrogen may be obtained from a gas cylinder or other source such as is indicated by reference numeral 72. A conduit 74 connects the nitrogen supply to the test fluid flow conduit 84. The inert gas pressurization, if any, is carried out immediately before withdrawing the pulling rod so that the pressurizing gas will not constitute a contaminant in the system.

The pulling operation, as previously noted, is accomplished by means of a hydraulic cylinder. The cylinder circuit is provided with a pressure compensated variable flow valve so as to permit dial selection of any pulling speed from 40 inches per minute down to 2 inches per minute with constant speed regardless of load.

The measurement of the force applied to the elastomeric tensile test specimen is performed in accordance with the following formula. If a sealed liquid filled metal bellows is immersed in a fluid under pressure, with the bellows relaxed so that the liquid inside the bellows is at the same pressure as the fluid outside of the bellows, then an applied force tending to stretch the bellows will result in a decrease in the pressure inside the bellows equal to the applied force divided by the effective area of the bellows. Thus, the pressure differential between the inside and outside of the bellows is a direct measure of the force tending to extend the bellows.

The method and apparatus described herein afford a new and improved technique for determinging the tensile strength of an elastomeric specimen in the presence of a test fluid and at elevated temperatures. By employing a flexible pressure-sensitive partition, as described above, to determine the magnitude of the tensile load being applied to the elastomeric specimen, a tensile testing system has been evolved whereby frictional errors in measurement, which would be encountered if mechanical tensile testing systems were used, are eliminated.

What is claimed is:

1. An apparatus for determining the tensile strength of an elastomeric specimen at elevated temperatures and in the presence of a test fluid, which comprises a casing for containing a body of test fluid under pressure, means for suspending an elastomeric specimen within said casing, a pressure responsive member disposed within and anchored to said casing, one portion of said specimen being connected with said pressure-responsive member, means for applying a tensile load to said elastomeric specimen whereby a difference in pressure is developed within said pressure responsive member and means for measuring this difference in pressure.

2. An apparatus for determining the tensile strength of elastomeric specimens, which comprises a casing, a pressure-sensing chamber disposed within and anchored at one end to said casing, means for attaching an elastomeric specimen to the outer end of said pressure-sensing chamber, means for applying a tensile load to said elastomeric specimen, means for admitting a fluid into said pressure-sensing chamber and means for admitting a fluid into said casing, means for pressurizing said fluids and means for measuring a difference in pressure between said fluids.

3. An apparatus for determining the tensile strength of elastomeric specimens, which comprises a casing, first and second specimen holders disposed within and in spaced relationship to said casing, said specimen holders being so arranged as to position an elastomeric specimen therebetween, means for applying a tensile load to said elastomeric specimen, a pressure-sensing chamber disposed within and anchored at one end to said casing, means for transmitting said tensile load through said elastomeric specimen to said pressure-sensing chamber, means for admitting a fluid into said pressure-sensing chamber, means for admitting a fluid into said casing, means for pressurizing said fluids and means for measuring a difference in pressure between said fluids.

4. An apparatus for determining the tensile strength of elastomeric specimens, which comprises a casing, first and second specimen holders disposed within and in spaced relationship to said casing, said specimen holders being so arranged as to position an elastomeric specimen therebetween, a pulling member, one of said specimen holders being connected with said pulling member, a pressure-sensing chamber, said pressure-sensing chamber being disposed within and anchored at one end to said casing, the other of said specimen holders being associated with said pressure-sensing chamber, means for applying a tensile load through said pulling member to said elastomeric specimen, means for admitting a fluid into said pressure-sensing chamber and means for admitting a fluid into said casing, means for heating said casing, means for pressurizing said fluids and means for measuring a difference in pressure between said fluids.

5. An apparatus for determining the tensile strength of elastomeric specimens, which comprises a casing, first and second brackets disposed within and in spaced relationship to said casing, a first cylindrical and rotatable specimen holder disposed within said first bracket and a second cylindrical and rotatable specimen holder disposed within said second bracket, said brackets with their specimen holders disposed therein being so arranged as to position an elastomeric specimen therebetween, a pulling member, one of said brackets being connected with said pulling member, a pressure-sensing chamber, said pressure-sensing chamber being disposed within and anchored at one end to said casing, the other of said brackets being connected with said pressure-sensing chamber, means for applying a tensile load through said pulling member to said elastomeric specimen, means for admitting a fluid into said pressure-sensitive chamber and means for admitting a fluid into said casing, means for heating said casing, means for pressurizing said fluids and means for measuring a difference in pressure between said fluids.

6. An apparatus for determining the tensile strength of elastomeric specimens, which comprises a casing, first and second brackets disposed within and in spaced relationship to said casing, a first cylindrical and rotatable specimen holder disposed within said first bracket and a second cylindrical and rotatable specimen holder disposed within said second bracket, each of said specimen holders having beveled edges of increased diameter for aligning an elastomeric specimen, said brackets with their specimen holders disposed therein being so arranged as to position an elastomeric specimen therebetween, a pulling member, one of said brackets being connected with said pulling member, a flexible metallic bellows, said bellows being disposed within and anchored at one end to said casing, the other of said brackets being connected with said bellows, means for applying a tensile load through said pulling member to said elastomeric specimen, means for admitting a fluid into said bellows, and means for admitting a fluid into said casing, means for heating said casing, means for pressurizing said fluids and means for measuring a difference in pressure between said fluids.

References Cited in the file of this patent

UNITED STATES PATENTS

| | | |
|---|---|---|
| 1,817,315 | Knapp | Aug. 4, 1931 |
| 2,467,129 | Huber | Apr. 12, 1949 |
| 2,545,482 | Manjoine et al. | Mar. 20, 1951 |
| 2,680,967 | Newman | June 15, 1954 |